United States Patent [19]

Yokota et al.

[11] 4,407,568

[45] Oct. 4, 1983

[54] LARGE APERTURE OBJECTIVE WITH BEHIND THE LENS DIAPHRAGM

[75] Inventors: Hideo Yokota, Tokyo; Sadahiko Tsuji, Yokohama, both of Japan

[73] Assignee: Canon Kabushiki Kaisha, Tokyo, Japan

[21] Appl. No.: 155,757

[22] Filed: Jun. 2, 1980

[30] Foreign Application Priority Data

Jun. 7, 1979 [JP] Japan .................. 54-71740

[51] Int. Cl.³ .................................. G02B 9/60
[52] U.S. Cl. .......................... 350/467; 350/449
[58] Field of Search ...................... 350/449, 467

[56] References Cited

U.S. PATENT DOCUMENTS

| 2,445,594 | 7/1948 | Bennett | 350/449 |
| 4,264,138 | 4/1981 | Imai | 350/467 |
| 4,289,385 | 9/1981 | Yamagata | 350/449 |

*Primary Examiner*—John K. Corbin
*Assistant Examiner*—Rebecca D. Gass
*Attorney, Agent, or Firm*—Toren, McGeady and Stanger

[57] ABSTRACT

A large aperture objective having a shorter physical length than 1.2 times the focal length thereof with an angular field of at least 54° and a diaphragm positioned on the image side of the rearmost lens surface. The objective comprises five elements constituting five components of which the first and second counting from the front are positive meniscus lenses of forward convexity, the third is a negative meniscus lens of rearward concavity, the fourth is a negative meniscus lens of forward concavity, and the fifth is a bi-convex lens with its rear surface of strong curvature. The objective is characterized by fulfilling the following conditions:

(1) $0.18\ f < D_1 < 0.28\ f$, where $D_1 = d_1 + d_2 + d_3 + d_4 + d_5$
(2) $0.08\ f < D_2 < 0.13\ f$, where $D_2 = d_7 + d_8 + d_9$
(3) $0.12\ f < d_6 < 0.15\ f$
(4) $0.35 < (R_1/R_2) < 0.5$
(5) $0.6 < (R_7/R_8) < 0.8$
(6) $|R_{10}/R_9| < 0.3$ where f is the focal length of the overall lens system; $R_i$ is the radius of curvature of the i-th surface; and $d_i$ is the axial thickness or air separation between the i-th and (i+1)th surfaces.

5 Claims, 28 Drawing Figures

SPHERICAL ABERRATION    ASTIGMATISM    DISTORTION (%)

LATERAL ABERRATION

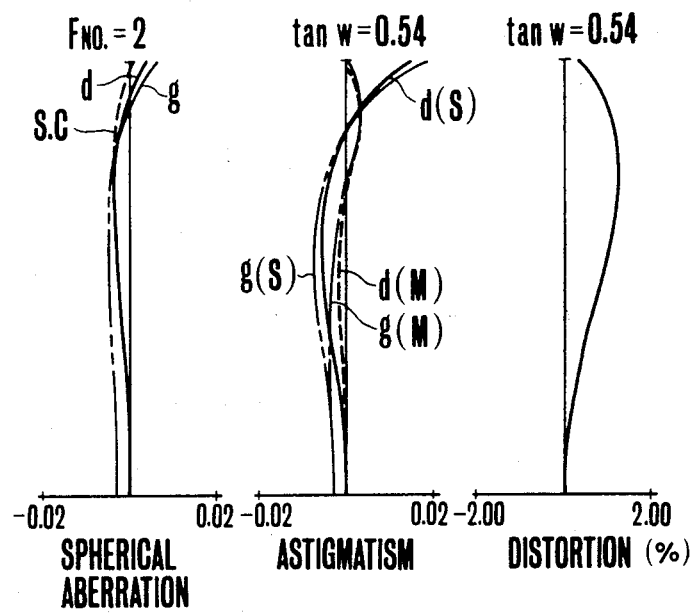
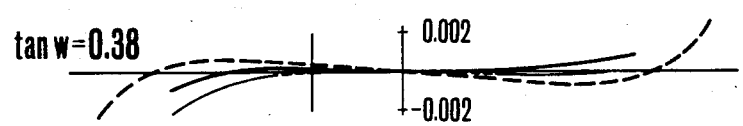
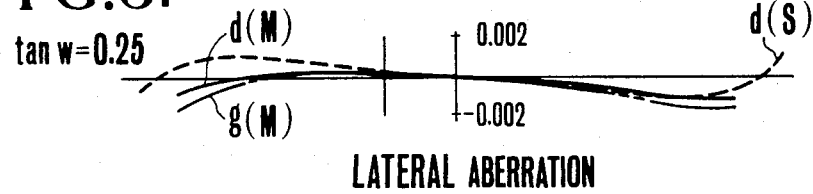

LATERAL ABERRATION

FIG.8A FIG.8B FIG.8C
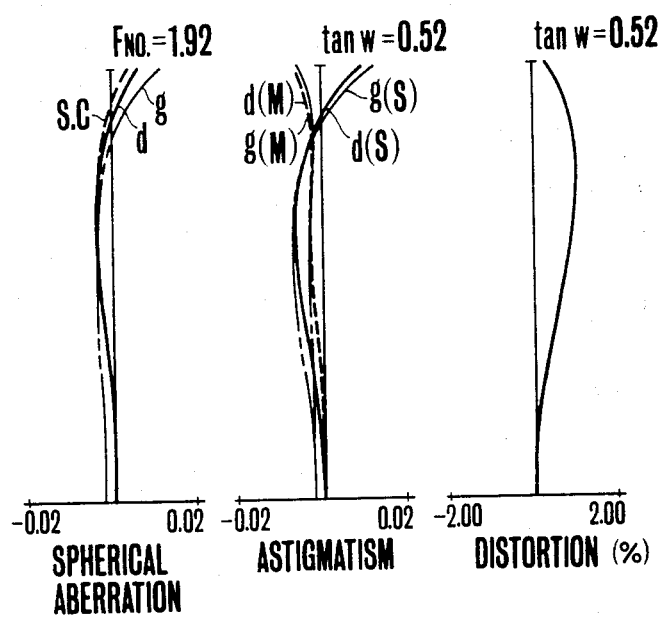
FIG.8D
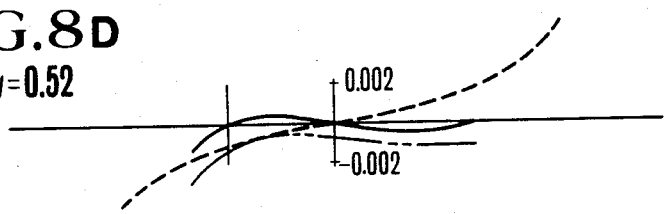
FIG.8E
FIG.8F
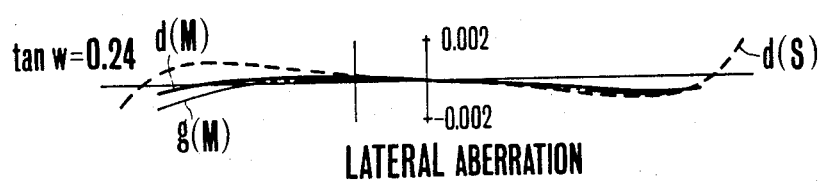

LARGE APERTURE OBJECTIVE WITH BEHIND THE LENS DIAPHRAGM

BACKGROUND OF THE INVENTION

This invention relates to photographic objectives of the standard or quasi-standard angular field, and more particularly to objectives of a large aperture ratio with a diaphragm in the image space.

Lens shutter type cameras require standard objectives to be of small bulk and size with an angle of view exceeding 54°. A type of lens which has gained general acceptance for an objective having a relative aperture as large as F/2, is the diaphragm interspaced Gauss type. An example of a modified Gauss type objective is disclosed in British Pat. No. 865,530.

These diaphragm-interspaced Gauss type objectives through producing more or less flare in the intermediate to the marginal region of the image field have been proven to give good correction of field curvature for high grade imaging performance throughout the entire area of the image field.

At the present time, on the other hand, photo-electric sensing of an object distance for automatic adjustment of the objective, or so-called auto-focus mechanisms has become practical, thereby freeing many photographers from troublesome focusing operation.

Since this mechanism is powered by a tensioned spring or an electric motor as the drive source to effect focusing, the employment of the diaphragm interspaced Gauss type in the lens design leads to the necessity of moving along with the lens system, the large mass of the diaphragm device associated with a shutter and other mechanical parts. This gives rise to disadvantages, the first of which is that a strong torque is required to assure the satisfactory operation, and second is that the diaphragm, shutter and auto-focus mechanism are also made complicated. These problems have contributed to the difficulty of minimizing the bulk and size of the camera.

Arrangement of the shutter diaphragm behind the objective lens system is an effective way to solve these problems. But, as the objective becomes faster with the F-number down to as low as 2, use of the rear diaphragm arrangement creates various aberrational problems. To avoid the reduction of the image quality, therefore, a sacrifice must be made, for example, by narrowing the angular field and elongating the physical length. Even in the improved conventional objectives such as that shown in Japanese Patent Sho 41-15463 (1966), the total length from the front vertex to the image plane is limited to 1.23 times the focal length or longer, and the angle of view to 52° or less.

SUMMARY OF THE INVENTION

An object of the present invention is to provide a photographic objective having a standard or quasi-standard angular field with the total length from the front vertex to the image plane being shortened while increasing the relative aperture.

Another object is to improve the imaging performance and to assure a high contrast over the entire area of an image field and particularly in the intermediate to the marginal region thereof for which the production of flare is prevented.

An objective of the present invention has five elements constituting five components. A diaphragm space is provided on the image side of the rear vertex of the objective. The first and second elements counting from the front are positive meniscus lenses of convex surface toward the front. The third element is a negative meniscus lens of concave surface toward the rear. The fourth element is a negative meniscus lens of concave surface toward the front. The fifth element is a bi-convex lens with the rear surface being stronger in curvatuve. Letting $R_i$ denote the radius of curvature of the i-th lens surface counting from the front, and $d_i$ the lens thickness or air spacing between the i-th and (i+1)th surfaces, the objective fulfils the following specific requirements:

(1) $0.18\ f < D_1 < 0.28\ f$, where $D_1 = d_1 + d_2 + d_3 + d_4 + d_5$
(2) $0.08\ f < D_2 < 0.13\ f$, where $D_2 = d_7 + d_8 + d_9$
(3) $0.12\ f < d_6 < 0.15\ f$
(4) $0.35 < (R_1/R_2) < 0.5$
(5) $0.6 < (R_7/R_8) < 0.8$
(6) $|R_{10}/R_9| < 0.3$ where f is the compound focal length of the entire lens system.

BRIEF DESCRIPTION OF THE DRAWINGS

FIGS. 6A to 6F are similar graphs of those of Example 2.

FIGS. 8A to 8F are similar graphs of those of Example 4.

DESCRIPTION OF THE PREFERRED EMBODIMENTS

Figure 1:
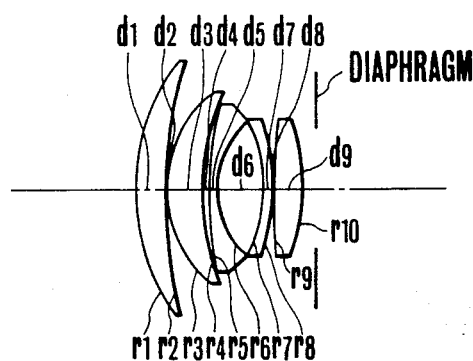
FIG. 1 is an optical diagram of an Example 1 of a Gauss type objective according to the present invention.
Figure 2:
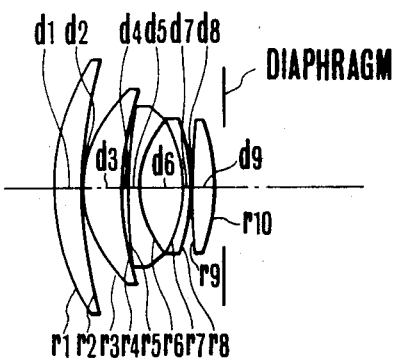
FIG. 2 is a similar diagram showing an Example 2 of the present invention.
Figure 3:
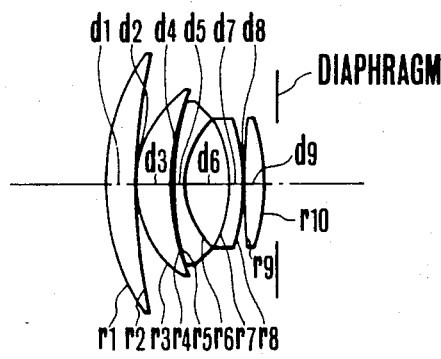
FIG. 3 is a similar diagram showing an Example 3 of the invention.
Figure 4:
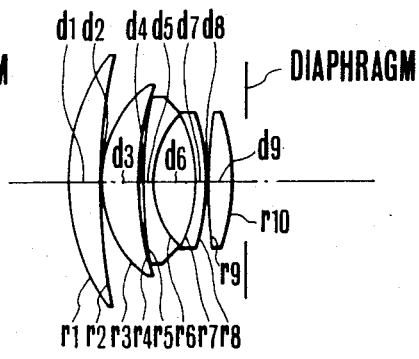
FIG. 4 is a similar diagram showing an Example 4 of the invention.

In order to shorten the total length of the objective to 1.2 times the focal length or thereabout within the framework of the behind-diaphragm Gauss type configuration, the first and second lenses necessarily have to be strengthened in refractive power, and the divergent lenses that follow are required to have a strengthened effect on correction of the spherical aberration. It has been, therefore, found that the sagittal image surface which is curved in a negative sense at the intermediate region of the image field is turnel rapidly to a positive curvatuve when the half-angle of view of $\omega = 25°$ is exceeded, and that the flare is objectionably increased in a region from the intermediate to the margin. Considering the fact that for the improvement of the field curvature, a great effect can be expected from the use of lens thicknesses and spacings as thin as possible, according to the present invention, the fourth lens which usually takes the form of a cemented lens of positive and negative elements is constructed in the form of a negative meniscus singlet resulting in the advantage that the lens thickness is minimized. And, as for the improvement of the flare, an air lens is provided between the second and third lenses to facilitate the improvement.

In such an arrangement, fulfilment of the specific conditions described results in an excellent objective. This is explained below. First, improvement of the image quality is made very effective by the thinning of the sum of the axial separations defined by $D_i$. On the other hand, such thinning makes it more difficult to impart to the first and second lenses the refractive powers necessary to shorten the total length of the objective. Accordingly, the necessity of condition (1) arises. When the upper limit of inequality (1) is exceeded, the sagittal image surface will be strongly curved in a positive sense. When the lower limit is exceeded, the lens diameter cannot be sufficiently large, so that one cannot help but to increase the F-number with a loss in lens speed, or elongate the back focal length with an increase in the total length of the objective above 1.2 times the focal length.

Thinning another sum of axial separations defined by $D_2$ is also effective to improve the image quality as has been mentioned above. This, on the other hand, causes increasing outward coma. Therefore, condition (2) is necessary. When the upper limit of inequality (2) is exceeded, the sagittal image surface is strongly curved at the margin. When the lower limit is exceeded, the outward coma is objectionably increased in the intermediate region of the image field to the margin.

The total length is shortened by shortening the spacing $d_6$. This is also advantageous for correction of inward coma of a circular zone in the intermediate region of the image field. However, when the spacing is shortened too much, the diameter of an air lens defined by $r_6$, $r_7$ and $d_6$ will become so small that all the axial rays at an aperture of 2 in F-number cannot pass therethrough. On this account, condition (3) is necessary. When the upper limit of inequality (3) is exceeded, inward coma of a circular zone in the intermediate region of the image field is objectionably increased, and it is difficult to shorten the total length below 1.2 times the focal length. When the lower limit is exceeded, it is difficult to achieve an increase of the lens speed to as fast as 2 in F-number.

Consideration is next given to the significances of the radii of curvature of the various lens surfaces. Bending the first lens affects the spherical aberration and distortion. In the objective aimed at by the present invention with the first lens of strong power, it is from the first lens that a strong positive distortion is produced. To suppress the increase of such distortion it is advantageous to select a large value of $R_1/R_2$, but this is unfavorable to suppress spherical aberration. Therefore, condition (4) is necessary. When the upper limit of inequality (4) is exceeded, good correction of spherical aberration will be difficult. When the lower limit is exceeded, positive distortion is objectionably increased.

The axial rays after their angles of inclination have been moderated by the third lens, enter the fourth lens. Therefore, the fourth lens may take the form of a negative meniscus lens of forward concavity. This offers the advantage that even when the power is relatively weak it produces, a strong effect on correction of spherical aberration. However, inward coma is also objectionably increased. Therefore, condition (5) is necessary. When the upper limit of inequality (5) is exceeded, correction of inward coma will become difficult. When the lower limit is exceeded, correction of spherical aberration will become difficult.

Bending the fifth lens has a large effect on correction of spherical aberration and astigmatism. In correction of spherical aberration, it is advantageous to select a large value for $R_{10}/R_9$, but astigmatism is, on the other hand, caused to increase in the marginal region of the image field. Therefore, condition (6) is important. When the upper limit is exceeded, good correction of negative astigmatism in the marginal region will be difficult to perform.

It should be noted that the front surface $r_5$ of the third lens also seriously affects the various aberrations, and therefore great care must be taken in configuring it. The selection of a smaller value for the radius of curvature of the lens surface $r_5$ can suppress the increase of the flare of the meridional circular zone and the sagittal flare of the image field to the margin, but on the other hand allows for the spherical aberration of the sagittal rays to be objectionably increased in the intermediate region of the image field so that the foci of the intermediate rays incline in a negative sense beyond the foci of the sagittal principal rays. This leads to a tendency of deteriorating the resolution of the sagittal field at or near the angle of view of $\omega = 16°$. Therefore, it is desirable that the radius of curvature of the surface $r_5$ lies between 0.8 and 2.2 times the focal length of the entire lens system.

Figures 5A, 5B, 5C:
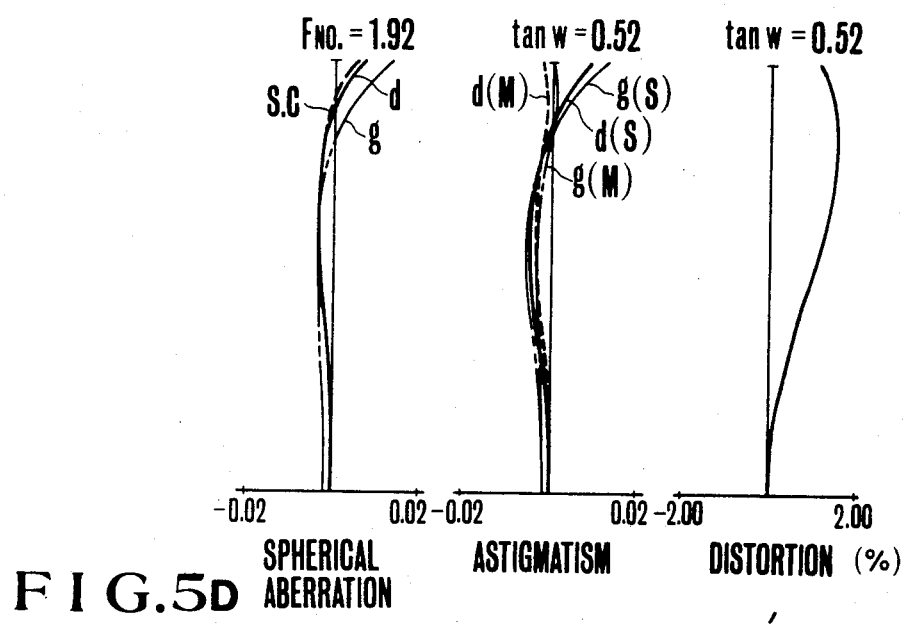
FIGS. 5A to 5F are graphic representations of the various aberrations of Example 1.
Figure 5D:
Figure 5E:
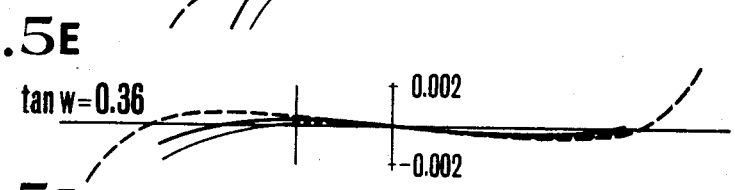
Figure 5F:
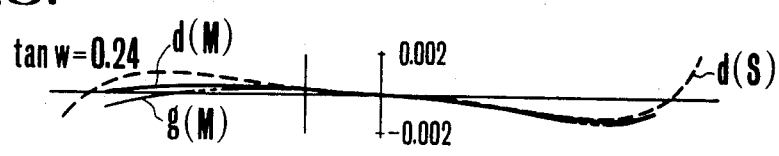
Figures 7A, 7B, 7C:
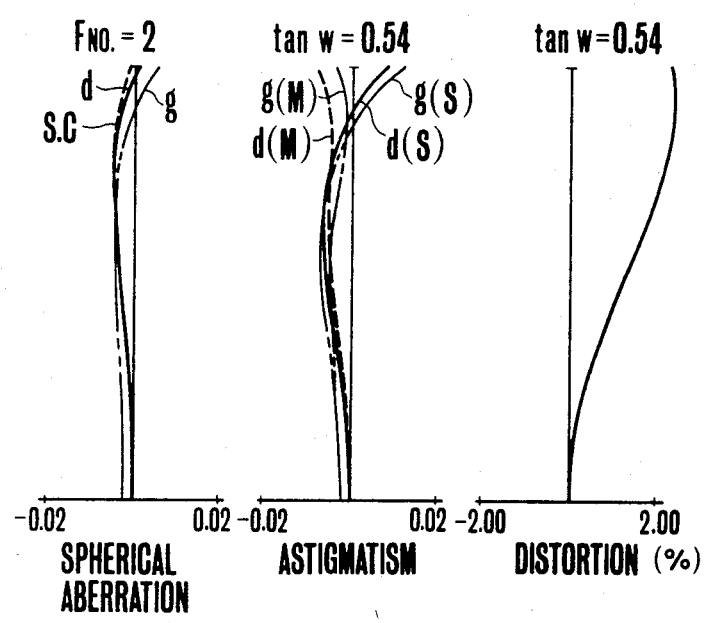
FIGS. 7A to 7F are similar graphs of those of Example 3.
Figure 7D:
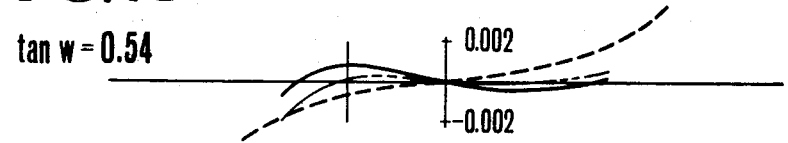
Figure 7E:
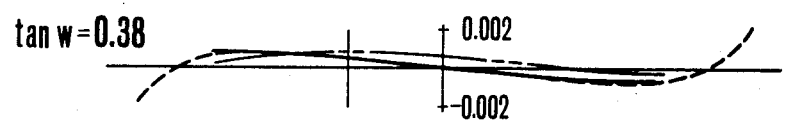
Figure 7F:
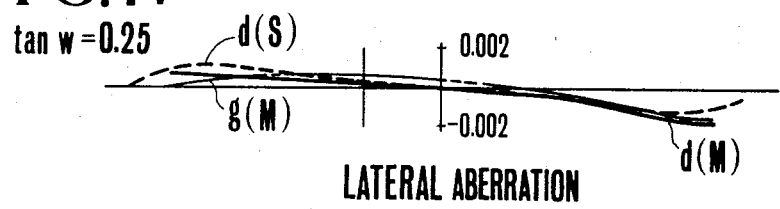

The following are four examples of specific objective lens systems with the numerical data for the radii of curvature, r, the lens thicknesses or air spacings, d, the refractive indices, Nd, for the various lens elements along with the corresponding Abbe numbers, $\nu d$. The various image aberrations of the lens systems when focused at infinity are shown in FIGS. 5A-5F, FIGS. 6A-6F, FIGS. 7A-7F and FIGS. 8A-8F where S.C.: since condition; d(S): the sagittal surface of d-line; d(M): the meridional surface of d-line; g(S): the sagittal surface of g-line; and g(M): the meridional surface of g-line. As is understandable from the lists of values of the aberrational coefficients and the aberration curves, each of the examples of the lens systems is well corrected for high grade imaging performance. This reveals that the conditions set forth in the present invention are adequate for the accomplishment of the objects thereof.

EXAMPLE 1 (FIG. 1)

| No. | Focal Length f = 1  F-number 1:1.92  Image Angle 2ω = 54.9° | | | |
|---|---|---|---|---|
| | r | d | Nd | νd |
| 1 | 0.6358 | 0.083 | 1.77250 | 49.6 |
| 2 | 1.3917 | 0.002 | | |
| 3 | 0.3486 | 0.109 | 1.77250 | 49.6 |
| 4 | 0.7814 | 0.016 | | |
| 5 | 1.3183 | 0.024 | 1.75520 | 27.5 |
| 6 | 0.2607 | 0.136 | | |
| 7 | −0.4056 | 0.024 | 1.72342 | 38.0 |
| 8 | −0.6088 | 0.00239 | | |
| 9 | 4.1728 | 0.08 | 1.78590 | 44.2 |
| 10 | −0.6035 | | | |

Total Length (from First Surface to Focal Plane) = 1.1326

| No. | Aberration Coefficient of Third Order | | | | | | |
|---|---|---|---|---|---|---|---|
| | L | T | SA | CM | AS | PT | DS |
| 1 | 0.0172 | 0.0025 | 0.9568 | 0.1424 | 0.0211 | 0.6855 | 0.1051 |

-continued

| | | Aberration Coefficient of Third Order | | | | | |
|---|---|---|---|---|---|---|---|
| No. | L | T | SA | CM | AS | PT | DS |
| 2 | 0.0001 | −0.0110 | 0.0000 | −0.0041 | 0.3265 | −0.3131 | −1.0552 |
| 3 | 0.0207 | 0.0019 | 0.7346 | 0.0685 | 0.0063 | 1.2503 | 0.1172 |
| 4 | 0.0087 | −0.0140 | 0.9280 | −1.4928 | 2.4014 | −0.5577 | −2.9656 |
| 5 | −0.0221 | 0.0277 | −1.9203 | 2.4033 | −3.0078 | 0.3263 | 3.3559 |
| 6 | −0.0335 | −0.0106 | −1.4912 | −0.4731 | −0.1500 | −1.6505 | −0.5712 |
| 7 | −0.0186 | 0.0142 | −1.7089 | 1.3096 | −1.0036 | −1.0348 | 1.5622 |
| 8 | 0.0104 | −0.0139 | 0.2275 | −0.3021 | 0.4012 | 0.6895 | −1.4486 |
| 9 | 0.0011 | 0.0126 | 0.0003 | 0.0033 | 0.0373 | 0.1054 | 1.5728 |
| 10 | 0.0172 | −0.0101 | 2.7250 | −1.6061 | 0.9466 | 0.7291 | −0.9876 |
| Total | 0.0015 | −0.0006 | 0.4519 | 0.0489 | −0.0208 | 0.2301 | −0.3149 |

L = Longitudinal Chromatic Aberration
T = Lateral Chromatic Aberration
SA = Spherical Aberration
CM = Coma
AS = Astigmatism
PT = Petzval Sum
DS = Distortion

EXAMPLE 2 (FIG. 2)

| | Focal Length f = 1   F-number 1:2.0 Image Angle 2ω = 56.7° | | | |
|---|---|---|---|---|
| No. | r | d | Nd | νd |
| 1 | 0.6676 | 0.080 | 1.77250 | 49.6 |
| 2 | 1.3831 | 0.003 | | |
| 3 | 0.3610 | 0.114 | 1.77250 | 49.6 |
| 4 | 0.8351 | 0.022 | | |
| 5 | 1.8175 | 0.025 | 1.74077 | 27.8 |
| 6 | 0.2741 | 0.133 | | |
| 7 | −0.3959 | 0.024 | 1.80518 | 25.4 |
| 8 | −0.5236 | 0.0025 | | |
| 9 | 2.6985 | 0.063 | 1.72342 | 38.0 |
| 10 | −0.6085 | | | |

Total Length = 1.128

EXAMPLE 3 (FIG. 3)

| | Focal Length f = 1   F-number 1:2.0 Image Angle 2ω = 56.7° | | | |
|---|---|---|---|---|
| No. | r | d | Nd | νd |
| 1 | 0.6775 | 0.084 | 1.77250 | 49.6 |
| 2 | 1.6702 | 0.003 | | |
| 3 | 0.3248 | 0.099 | 1.77250 | 47.7 |
| 4 | 0.6876 | 0.014 | | |
| 5 | 1.0781 | 0.025 | 1.73233 | 27.3 |
| 6 | 0.2491 | 0.128 | | |
| 7 | −0.4378 | 0.045 | 1.66348 | 40.2 |
| 8 | −0.6715 | 0.003 | | |
| 9 | 2.9457 | 0.057 | 1.65844 | 50.8 |
| 10 | −0.6185 | | | |

Total Length = 1.111

| | Aberration Coefficient of Third Order | | | | | | |
|---|---|---|---|---|---|---|---|
| No. | L | T | SA | CM | AS | PT | DS |
| 1 | 0.0163 | 0.0036 | 0.7906 | 0.1738 | 0.0382 | 0.6432 | 0.1498 |
| 2 | 0.0014 | −0.0116 | 0.0059 | −0.0487 | 0.3978 | −0.2609 | −1.1179 |
| 3 | 0.0240 | 0.0018 | 1.0792 | 0.0826 | 0.0063 | 1.3417 | 0.1031 |
| 4 | 0.0084 | −0.0143 | 0.7799 | −1.3216 | 2.2395 | −0.6338 | −2.7209 |
| 5 | −0.0209 | 0.0267 | −1.7228 | 2.1928 | −2.7910 | 0.3921 | 3.0532 |
| 6 | −0.0344 | −0.0107 | −1.5050 | −0.4712 | −0.1475 | −1.6970 | −0.5776 |
| 7 | −0.0163 | 0.0127 | −1.6857 | 1.3146 | −1.0251 | −0.9110 | 1.5099 |
| 8 | 0.0096 | −0.0121 | 0.2933 | −0.3675 | 0.4604 | 0.5939 | −1.3209 |
| 9 | 0.0004 | 0.0098 | 0.0001 | 0.0031 | 0.0693 | 0.1347 | 1.4411 |
| 10 | 0.0132 | −0.0078 | 2.4536 | −1.4636 | 0.8730 | 0.6419 | −0.9037 |
| Total | 0.0019 | −0.0020 | 0.4890 | 0.0879 | −0.0176 | 0.2449 | −0.3838 |

L = Longitudinal Chromatic Aberration
T = Lateral Chromatic Aberration
SA = Spherical Aberration
CM = Coma
AS = Astigmatism
PT = Petzval Sum
DS = Distortion

EXAMPLE 4 (FIG. 4)

| | Focal Length f = 1   F-number 1:1.92 Image Angle 2ω = 54.9° | | | |
|---|---|---|---|---|
| No. | r | d | Nd | νd |
| 1 | 0.6186 | 0.095 | 1.72000 | 50.2 |
| 2 | 1.6639 | 0.002 | | |
| 3 | 0.3414 | 0.113 | 1.65844 | 50.9 |
| 4 | 0.8358 | 0.017 | | |
| 5 | 1.5970 | 0.024 | 1.75520 | 2 |
| 6 | 0.2685 | 0.131 | | |
| 7 | −0.4132 | 0.037 | 1.72342 | 38.0 |
| 8 | −0.6058 | 0.00239 | | |
| 9 | 2.7705 | 0.007 | 1.78590 | 44.2 |
| 10 | −0.6449 | | | |

Total Length = 1.1488

In the following, there are listed the values of the factors in the inequalities (1) to (6) for Examples 1 to 4.

| Condition | Example 1 | Example 2 | Example 3 | Example 4 |
|---|---|---|---|---|
| (1) | 0.23439 | 0.24351 | 0.22501 | 0.2512 |
| (2) | 0.10676 | 0.09019 | 0.10475 | 0.10916 |
| (3) | 0.13617 | 0.1326 | 0.1286 | 0.13086 |
| (4) | 0.4568 | 0.4827 | 0.4056 | 0.37179 |
| (5) | 0.6663 | 0.7561 | 0.652 | 0.6821 |
| (6) | 0.1446 | 0.2255 | 0.20995 | 0.2328 |

What is claimed is:

1. A large aperture objective with a behind the lens diaphragm comprising five components of which the first and the second counting from the front are positive meniscus lenses of convex surface toward the front, the third is a negative meniscus lens of concave surface toward the rear, the fourth is a negative meniscus lens of concave surface toward the front, and the fifth is a bi-convex lens with its rear surface of strong curvature toward the rear, said diaphragm being positioned on the image side of said fifth lens and said objective satisfying the following conditions:

(1) $0.18\ f < D_1 < 0.28\ f$, where $D_1 = d_1 + d_2 + d_3 + d_4 + d_5$ (2) $0.08\ f < D_2 < 0.18\ f$, where $D_2 = d_7 + d_8 + d_9$ (3) $0.12\ f < d_6 < 0.15\ f$ (4) $0.35 < (R_1/R_2) < 0.5$ (5) $0.6 < (R_7/R_8) < 0.8$ (6) $|R_{10}/R_9| < 0.3$ wherein $R_i$ is the radius of curvature of the i-th lens surface counting from the front; di is the axial thickness or air spacing between the i-th and (i+1)th lens surfaces; and f is the focal length of the entire lens system.

2. A large aperture objective as described in claim 1, and where said objective has, with respect to a normalized focal length of f=1, the following numerical data:

| No. | F-number 1:1.92 r | Image Angle 2ω = 54.9° d | Nd | νd |
|---|---|---|---|---|
| 1 | 0.6358 | 0.083 | 1.77250 | 49.6 |
| 2 | 1.3917 | 0.002 | | |
| 3 | 0.3486 | 0.109 | 1.77250 | 49.6 |
| 4 | 0.7814 | 0.016 | | |
| 5 | 1.3183 | 0.024 | 1.75520 | 27.5 |
| 6 | 0.2607 | 0.136 | | |
| 7 | −0.4056 | 0.024 | 1.72342 | 38.0 |
| 8 | −0.6088 | 0.082 | | |
| 9 | 4.1728 | 0.038 | 1.78590 | 44.2 |
| 10 | −0.6035 | | | |

(r = the radii of curvature; d = the lens thicknesses or air spacings; Nd = the refractive indices; and νd = the Abbe numbers).

3. A large aperture objective as described in claim 1, and wherein said objective has, with respect to a normalized focal length of f=1, the following numerical data:

| No. | F-number 1:2.0 r | Image Angle 2ω = 56.7° d | Nd | νd |
|---|---|---|---|---|
| 1 | 0.6676 | 0.080 | 1.77250 | 49.6 |
| 2 | 1.3831 | 0.003 | | |
| 3 | 0.3610 | 0.114 | 1.77250 | 49.6 |
| 4 | 0.8351 | 0.022 | | |
| 5 | 1.8175 | 0.025 | 1.74077 | 27.8 |
| 6 | 0.2741 | 0.133 | | |
| 7 | −0.3959 | 0.024 | 1.80518 | 25.4 |
| 8 | −0.5236 | 0.066 | | |
| 9 | 2.6985 | 0.025 | 1.72342 | 38.0 |
| 10 | −0.6085 | | | |

(r = the radii of curvature; d = the lens thicknesses or air spacings; Nd = the refractive indices; and νd = the Abbe numbers).

4. A large aperture objective as described in claim 1, and wherein said objective has, with respect to a normalized focal length of f=1, the following numerical data:

| No. | F-number 1:2.0 r | Image Angle 2ω = 56.7° d | Nd | νd |
|---|---|---|---|---|
| 1 | 0.6775 | 0.084 | 1.77250 | 49.6 |
| 2 | 1.6702 | 0.003 | | |
| 3 | 0.3248 | 0.099 | 1.77250 | 47.7 |
| 4 | 0.6876 | 0.014 | | |
| 5 | 1.0781 | 0.025 | 1.73233 | 27.3 |
| 6 | 0.2491 | 0.128 | | |
| 7 | −0.4378 | 0.045 | 1.66348 | 40.2 |
| 8 | −0.6715 | 0.060 | | |
| 9 | 2.9457 | 0.038 | 1.65844 | 50.8 |
| 10 | −0.6185 | | | |

(r = the radii of curvature; d = the lens thicknesses or air spacings; Nd = the refractive indices; and νd = the Abbe numbers).

5. A large aperture objective as described in claim 1, and wherein said objective has, with respect to a focal length normalized to unity, the following numerical data:

| No. | F-number 1:1.92 r | Image Angle 2ω = 54.9° d | Nd | νd |
|---|---|---|---|---|
| 1 | 0.6186 | 0.095 | 1.72000 | 50.2 |
| 2 | 1.6639 | 0.002 | | |
| 3 | 0.3414 | 0.113 | 1.65844 | 50.9 |
| 4 | 0.8358 | 0.017 | | |
| 5 | 1.5970 | 0.024 | 1.75520 | 2 |
| 6 | 0.2685 | 0.131 | | |
| 7 | −0.4132 | 0.037 | 1.72342 | 38.0 |
| 8 | −0.6058 | 0.072 | | |
| 9 | 2.7705 | 0.038 | 1.78590 | 44.2 |
| 10 | −0.6449 | | | |

(r = the radii of curvature; d = the lens thicknesses or air spacings; Nd = the refractive indices; and νd = the Abbe numbers).

* * * * *